(12) United States Patent
Burns et al.

(10) Patent No.: US 9,904,055 B2
(45) Date of Patent: Feb. 27, 2018

(54) SMART PLACEMENT OF VIRTUAL OBJECTS TO STAY IN THE FIELD OF VIEW OF A HEAD MOUNTED DISPLAY

(71) Applicant: Microsoft Technology Licensing, LLC, Redmond, WA (US)

(72) Inventors: Aaron Burns, Newcastle, WA (US); Ben Sugden, Redmond, WA (US); Tom Salter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/612,850

(22) Filed: Feb. 3, 2015

(65) Prior Publication Data

US 2016/0025981 A1    Jan. 28, 2016

Related U.S. Application Data

(60) Provisional application No. 62/029,351, filed on Jul. 25, 2014.

(51) Int. Cl.
   *G02B 27/00* (2006.01)
   *G02B 27/01* (2006.01)
   *G06F 3/01* (2006.01)

(52) U.S. Cl.
   CPC ..... *G02B 27/0172* (2013.01); *G02B 27/0093* (2013.01); *G02B 27/0101* (2013.01);
   (Continued)

(58) Field of Classification Search
   None
   See application file for complete search history.

(56) References Cited

U.S. PATENT DOCUMENTS

| 5,819,206 A | 10/1998 | Horton et al. |
| 5,877,748 A | 3/1999 | Redlich |

(Continued)

FOREIGN PATENT DOCUMENTS

| CN | 101540020 B | 9/2012 |
| CN | 103761085 A | 4/2014 |

(Continued)

OTHER PUBLICATIONS

"International Search Report & Written Opinion Issued in PCT Application No. PCT/US2015/041862", dated Nov. 16, 2015, (11 Pages total).

(Continued)

*Primary Examiner* — Kent Chang
*Assistant Examiner* — Benjamin Morales Fernande
(74) *Attorney, Agent, or Firm* — Mark K. Young; Mayer & Williams PC

(57) ABSTRACT

An HMD device is configured to check the placement of newly introduced objects in a virtual reality environment such as interactive elements like menus, widgets, and notifications to confirm that the objects are significantly present within the user's field of view. If the intended original placement would locate the object outside the field of view, the HMD device relocates the object so that a portion of the object is viewable at the edge of the HMD display closest to its original placement. Such smart placement of virtual objects enables the user to readily discover new objects when they are introduced into the virtual reality environment, and then interact with the objects within a range of motions and/or head positions that is comfortable to support a more optimal interaction and user experience.

20 Claims, 18 Drawing Sheets

(52) U.S. Cl.
CPC ............ *G02B 27/017* (2013.01); *G06F 3/011* (2013.01); *G06F 3/012* (2013.01); *G02B 2027/014* (2013.01); *G02B 2027/0123* (2013.01); *G02B 2027/0178* (2013.01); *G09G 2320/0261* (2013.01)

(56) References Cited

U.S. PATENT DOCUMENTS

| | | | |
|---|---|---|---|
| 6,012,926 | A | 1/2000 | Hodges et al. |
| 6,023,275 | A | 2/2000 | Horvitz |
| 6,329,986 | B1 | 12/2001 | Cheng |
| 6,396,495 | B1 | 5/2002 | Parghi et al. |
| 6,396,497 | B1 | 5/2002 | Reichlen |
| 6,529,331 | B2 | 3/2003 | Massof et al. |
| 6,552,698 | B1 | 4/2003 | Walker |
| 6,741,241 | B1 | 5/2004 | Jaubert et al. |
| 6,898,266 | B2 | 5/2005 | Griffith |
| 7,274,380 | B2 | 9/2007 | Navab et al. |
| 7,386,799 | B1 | 6/2008 | Clanton et al. |
| 7,400,322 | B1 | 7/2008 | Urbach |
| 7,486,817 | B2 | 2/2009 | Yanagawa et al. |
| 7,538,775 | B2 | 5/2009 | Ishihara |
| 7,542,210 | B2 | 6/2009 | Chirieleison, Sr. |
| 7,557,774 | B2 | 7/2009 | Baudisch et al. |
| 8,049,750 | B2 | 11/2011 | Gloudemans et al. |
| 8,266,536 | B2 | 9/2012 | Roberts et al. |
| 8,405,680 | B1 | 3/2013 | Cardoso Lopes |
| 8,576,247 | B2 | 11/2013 | Avkarogullari et al. |
| 8,611,015 | B2 | 12/2013 | Wheeler et al. |
| 8,751,969 | B2 | 6/2014 | Matsuda et al. |
| 8,754,931 | B2 | 6/2014 | Gassel et al. |
| 8,780,014 | B2 | 7/2014 | Border et al. |
| 8,793,620 | B2 | 7/2014 | Stafford |
| 9,372,345 | B2* | 6/2016 | Fujimaki ............... G02B 27/017 |
| 9,443,352 | B1 | 9/2016 | Glover |
| 2001/0035845 | A1 | 11/2001 | Zwern |
| 2002/0044152 | A1 | 4/2002 | Abbott et al. |
| 2002/0154214 | A1 | 10/2002 | Scallie et al. |
| 2002/0181115 | A1 | 12/2002 | Massof et al. |
| 2003/0091226 | A1 | 5/2003 | Cahill |
| 2005/0024388 | A1 | 2/2005 | Takemoto |
| 2005/0143887 | A1 | 6/2005 | Kinoshita |
| 2005/0179703 | A1 | 8/2005 | Johnson |
| 2006/0050070 | A1 | 3/2006 | Matsui |
| 2006/0092178 | A1 | 5/2006 | Tanguay, Jr. |
| 2006/0095207 | A1 | 5/2006 | Reid |
| 2006/0241827 | A1 | 10/2006 | Fukuchi |
| 2007/0057946 | A1 | 3/2007 | Albeck |
| 2007/0132662 | A1 | 6/2007 | Morita |
| 2008/0174659 | A1 | 7/2008 | McDowall |
| 2008/0195315 | A1 | 8/2008 | Hu |
| 2008/0284864 | A1 | 11/2008 | Kotake |
| 2009/0160985 | A1 | 6/2009 | Javidi |
| 2009/0167785 | A1 | 7/2009 | Wong |
| 2009/0189974 | A1 | 7/2009 | Deering |
| 2009/0325699 | A1 | 12/2009 | Delgiannidis |
| 2010/0208035 | A1 | 8/2010 | Pinault |
| 2010/0208057 | A1 | 8/2010 | Meier |
| 2010/0226017 | A1* | 9/2010 | Spaller ............... G02B 27/0172 359/630 |
| 2010/0315413 | A1 | 12/2010 | Izadi et al. |
| 2011/0029903 | A1 | 2/2011 | Schooleman et al. |
| 2011/0043627 | A1 | 2/2011 | Werling et al. |
| 2011/0140994 | A1 | 6/2011 | Noma |
| 2012/0052917 | A1 | 3/2012 | Kim |
| 2012/0056876 | A1 | 3/2012 | Lee et al. |
| 2012/0068913 | A1 | 3/2012 | Bar-Zeev et al. |
| 2012/0092328 | A1 | 4/2012 | Flaks |
| 2012/0113092 | A1 | 5/2012 | Bar-Zeev et al. |
| 2012/0195471 | A1 | 8/2012 | Newcombe |
| 2012/0237116 | A1 | 9/2012 | Xiao |
| 2012/0249741 | A1* | 10/2012 | Maciocci ............... G06F 3/011 348/46 |
| 2012/0309522 | A1 | 12/2012 | Westlund et al. |
| 2012/0313839 | A1 | 12/2012 | Smithwick |
| 2012/0327116 | A1 | 12/2012 | Liu et al. |
| 2013/0044128 | A1 | 2/2013 | Liu et al. |
| 2013/0050258 | A1 | 2/2013 | Liu et al. |
| 2013/0050432 | A1 | 2/2013 | Perez et al. |
| 2013/0083007 | A1 | 4/2013 | Geisner et al. |
| 2013/0083018 | A1 | 4/2013 | Geisner |
| 2013/0088413 | A1 | 4/2013 | Raffle et al. |
| 2013/0093789 | A1 | 4/2013 | Liu et al. |
| 2013/0127860 | A1 | 5/2013 | Hadap |
| 2013/0127980 | A1* | 5/2013 | Haddick ............... G06F 3/013 348/14.08 |
| 2013/0137076 | A1 | 5/2013 | Perez et al. |
| 2013/0141419 | A1 | 6/2013 | Mount |
| 2013/0147686 | A1 | 6/2013 | Clavin et al. |
| 2013/0194259 | A1 | 8/2013 | Bennett et al. |
| 2013/0222647 | A1 | 8/2013 | Ishihara |
| 2013/0257751 | A1 | 10/2013 | Stafford |
| 2013/0287290 | A1 | 10/2013 | Owechko |
| 2013/0300637 | A1 | 11/2013 | Smits et al. |
| 2013/0307855 | A1 | 11/2013 | Lamb et al. |
| 2013/0326364 | A1 | 12/2013 | Latta et al. |
| 2013/0328927 | A1 | 12/2013 | Mount et al. |
| 2013/0335301 | A1* | 12/2013 | Wong ............... G02B 27/0093 345/8 |
| 2013/0335303 | A1 | 12/2013 | Maciocci et al. |
| 2013/0336629 | A1 | 12/2013 | Mulholland et al. |
| 2013/0342564 | A1 | 12/2013 | Kinnebrew et al. |
| 2013/0342570 | A1 | 12/2013 | Kinnebrew et al. |
| 2014/0002444 | A1 | 1/2014 | Bennett et al. |
| 2014/0049559 | A1 | 2/2014 | Fleck et al. |
| 2014/0098009 | A1 | 4/2014 | Prest |
| 2014/0104142 | A1 | 4/2014 | Bickerstaff et al. |
| 2014/0125557 | A1 | 5/2014 | Issayeva |
| 2014/0132484 | A1 | 5/2014 | Pandey |
| 2014/0132715 | A1 | 5/2014 | Raghoebardayal |
| 2014/0139639 | A1 | 5/2014 | Wagner |
| 2014/0140579 | A1 | 5/2014 | Takemoto |
| 2014/0168264 | A1 | 6/2014 | Harrison |
| 2014/0176530 | A1 | 6/2014 | Path re |
| 2014/0184550 | A1 | 7/2014 | Hennessey et al. |
| 2014/0204117 | A1 | 7/2014 | Kinnebrew et al. |
| 2014/0221090 | A1 | 8/2014 | Mutschler et al. |
| 2014/0240351 | A1 | 8/2014 | Scavezze et al. |
| 2014/0253605 | A1 | 9/2014 | Border et al. |
| 2014/0267400 | A1 | 9/2014 | Mabbutt |
| 2014/0317555 | A1* | 10/2014 | Choi ............... G06F 3/04817 715/781 |
| 2014/0363073 | A1 | 12/2014 | Shirakyan |
| 2014/0372957 | A1 | 12/2014 | Keane et al. |
| 2015/0138081 | A1* | 5/2015 | Iwatsu ............... G06F 3/012 345/157 |
| 2015/0138239 | A1 | 5/2015 | Kim |
| 2015/0143459 | A1 | 5/2015 | Molnar |
| 2015/0145887 | A1 | 5/2015 | Forutanpour |
| 2015/0178956 | A1 | 6/2015 | Davis |
| 2015/0186016 | A1* | 7/2015 | Li ............... G06F 3/04847 715/765 |
| 2015/0205106 | A1* | 7/2015 | Norden ............... G02B 27/01 345/7 |
| 2015/0243078 | A1 | 8/2015 | Watson |
| 2015/0261293 | A1 | 9/2015 | Wilairat |
| 2015/0355709 | A1 | 12/2015 | Lee |
| 2015/0356788 | A1 | 12/2015 | Abe |
| 2016/0011724 | A1* | 1/2016 | Wheeler ............... G06F 3/0482 715/822 |

FOREIGN PATENT DOCUMENTS

| | | |
|---|---|---|
| EP | 1521482 A2 | 4/2005 |
| EP | 2164045 A2 | 3/2010 |
| WO | 2009128781 A1 | 10/2009 |
| WO | 2013029097 A2 | 3/2013 |
| WO | 2013052855 A2 | 4/2013 |
| WO | 2013057649 A1 | 4/2013 |
| WO | 2013085193 A1 | 6/2013 |

(56) References Cited

FOREIGN PATENT DOCUMENTS

| WO | 2013155217 A1 | 10/2013 |
| WO | 2014188798 A1 | 11/2014 |
| WO | 2015108887 A1 | 7/2015 |

OTHER PUBLICATIONS

"International Preliminary Report on Patentability Issued in PCT Application No. PCT/US2015/041868", dated Oct. 28, 2015, (10 Pages total).

"International Preliminary Report on Patentability Issued in PCT Application No. PCT/US2015/041864", dated Oct. 26, 2015, (11 Pages total).

Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.

Murray, et al., "Comparison of Head Gaze and Head and Eye Gaze within an Immersive Environment", In Tenth IEEE International Symposium on Distributed Simulation and Real-Time Applications, Oct. 2, 2006, 7 pages.

Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.

Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.

Ponto, et al., "Perceptual Calibration for Immersive Display Environments", In IEEE Transactions on Visualization and Computer Graphics, vol. 19, Issue 4, Apr. 2013, pp. 691-700, 10 pages.

Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.

Li, et al., "The Underestimation of Egocentric Distance: Evidence from Frontal Matching Tasks", In Proceedings of Attention, Perception & Psychophysics, Oct. 2011, 15 pages.

Howe, Bo, "Holographic Computer Monitor", Published on: Aug. 18, 2010, Available at: www.youtube.com/watch?v=tHlxj7fY-38, 2 pages.

Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.

Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.

Chen, Jian, "A Virtual Environment System for the Comparative Study of Dome and HMD", In Master Thesis, Department of Computer Science, University of Houston, May 2002, 104 pages.

McCarthy, Mike, "HP intros new versions of its mobile and tower workstations", Retrieved on: Sep. 11, 2014, Available at: http://postperspective.com/hp-intros-new-versions-pro-offerings/, 5 pages.

Nakashima, et al., "A 2D-3D Integrated Environment for Cooperative Work", In Proceedings of the Virtual Reality Software and Technology, Nov. 7, 2005, 7 pages.

Pierce, et al., "Image Plane Interaction Techniques in 3D Immersive Environments", In Proceedings of the symposium on Interactive 3D graphics, Apr. 30, 1997, 10 pages.

Regenbrecht, et al., "Interaction in a Collaborative Augmented Reality Environment", In Proceedings of CHI Extended Abstracts on Human Factors in Computing Systems, Apr. 20, 2002, 2 pages.

"Touchscreen interface for seamless data transfer between the real and virtual worlds", Published on: Apr. 15, 2013, Available at: http://www.diginfo.tv/v/13-0025-r-en.php, 8 pages.

Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.

Steinicke, et al., "Natural Perspective Projections for Head-Mounted Displays", In IEEE Transactions on Visualization and Computer Graphics, Jul. 2011, 12 pages.

Hogue, David, "What Are Index and Alpha Transparency?", Published on: Mar. 3, 2011, Available at: http://www.idux.com/2011/02/27/what-are-index-and-alpha-transparency/, 14 pages.

Jimenez, et al., "Gaze-based Interaction for Virtual Environments", In Journal of Universal Computer Science, vol. 14, Issue 19, Nov. 2008, 14 pages.

Kinoshita, et al., "A Fast and Robust 3D Head Pose and Gaze Estimation System", In 8th IEEE International Conference onAutomatic Face & Gesture Recognition, Sep. 17, 2008, 2 pages.

Peterson, et al., "Evaluation of Alternative Label Placement Techniques in Dynamic Virtual Environments", In Proceedings of the 10th International Symposium on Smart Graphics, May 22, 2009, 7 pages.

Kuhl, et al., "HMD Calibration and its Effects on Distance Judgments", In Proceedings of the 5th symposium on Applied perception in graphics and visualization, Aug. 9, 2008, 24 pages.

Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.

Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.

Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.

Nóbrega, et al., "Magnetic Augmented Reality: Virtual Objects in Your Space", In Proceedings of the International Working Conference on Advanced Visual Interfaces, May 21, 2012, pp. 332-335, 4 pages.

Izadi, et al., "KinectFusion: Real-time 3D Reconstruction and Interaction Using a Moving Depth Camera", In Proceedings of the 24th annual ACM symposium on User interface software and technology, Oct. 16, 2011, 10 pages.

Kalkofen, et al., "Visualization Techniques for Augmented Reality", In Proceedings of Handbook of Augmented Reality, Jul. 13, 2011, pp. 65-98, 34 pages.

Maimone, et al., "Computational Augmented Reality Eyeglasses", In Proceedings of IEEE International Symposium on Mixed and Augmented Reality, Oct. 1, 2013, 10 pages.

"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).

"International Search Report and Written Opinion Issued in PCT Patent Application No. PCT/US2015/041861", dated Oct. 30, 2015, (11 pages total).

"International Search Report and Written Opinion Issued in PCT Application No. PCT/US2015/041867", dated Nov. 25, 2015, (11 Pages total).

"International Search Report & Written Opinion Received for PCT Application No. PCT/US2015/041863",dated Nov. 16, 2015, (12 Pages total).

"Second Written Opinion Issued in PCT Application No. PCT/US2015/041866", dated Jun. 27, 2016, 7 Pages.

"Second Written Opinion Issued in PCT Application No. PCT/US2015/041865", dated Jun. 15, 2016, 8 Pages.

"Second Written Opinion Issued in PCT Application No. PCT/US2015/041868", dated Jul. 1, 2016, (6 Pages).

Duchowski, Andrew, "Chapter 7—Head-Mounted System Software Development", In Book Eye Tracking Methodology, Theory and Practice, Part 2, Jan. 1, 2007, pp. 69-86. (18 pages total).

(56) References Cited

OTHER PUBLICATIONS

"Second Written Opinion Issued in PCT Application No. PCT/US2015/041863", dated Jun. 15, 2016, 7 Pages.

"Second Written Opinion Issued in PCT Application No. PCT/US2015/041861", dated Jun. 20, 2016, 6 Pages.

"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00/$10.00 © 2000 IEEE) (10 pages total).

"Second Written Opinion Issued in PCT Application No. PCT/US2015/041862", dated Jun. 13, 2016, 5 Pages.

"International Preliminary Report on Patentability Issued in PCT Application No. PCT/US2015/041868", dated Oct. 13, 2016, 8 Pages.

"International Preliminary Report on Patentability Issued in PCT Application No. PCT/US2015/041863", dated Oct. 13, 2016, 8 Pages.

"International Preliminary Report on Patentability Issued in PCT Application No. PCT/US2015/041862", dated Oct. 13, 2016, 6 Pages.

"International Preliminary Report on Patentability Issued in PCT Application No. PCT/US2015/041861", dated Oct. 13, 2016, 7 Pages.

"International Preliminary Report on Patentability Issued in PCT Application No. PCT/US2015/041865", dated Oct. 19, 2016, 7 Pages.

"International Preliminary Report on Patentability Issued in PCT Application No. PCT/US2015/041866", dated Oct. 27, 2016, 9 Pages.

"International Search Report and Written Opinion Issued in PCT Application No. PCT/US2015/041865", dated Jan. 25, 2016, 12 Pages.

"International Search Report & Written Opinion Issued in PCT Patent Application No. PCT/US2015/041866", dated Nov. 27, 2015, 12 Pages.

* cited by examiner

Looking forward (neutral orientation)

Looking up

Looking left

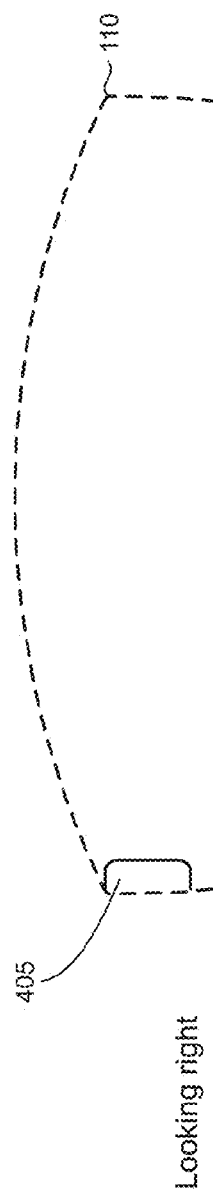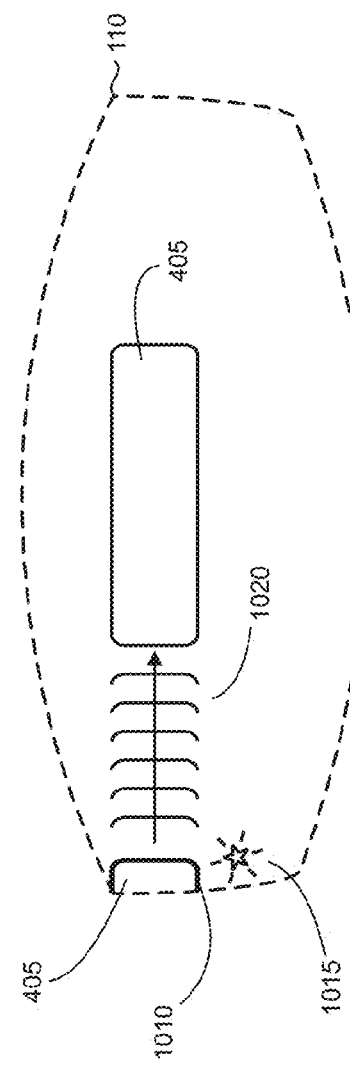

SMART PLACEMENT OF VIRTUAL
OBJECTS TO STAY IN THE FIELD OF VIEW
OF A HEAD MOUNTED DISPLAY

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Virtual reality computing devices, such as head mounted display (HMD) systems and handheld mobile devices (e.g. smart phones, tablet computers, etc.), may be configured to display a virtual reality environment to a user in the field of view of the user and/or a field of view of a camera of the device. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An HMD device is configured to check the placement of newly introduced objects in a virtual reality environment such as interactive elements including menus, widgets, and notifications to confirm that the objects are significantly present within the user's field of view. If the intended original placement would locate the object outside the field of view, the HMD device relocates the object so that a portion of the object is viewable at the edge of the HMD display closest to its original placement. Such smart placement of virtual objects enables the user to readily discover new objects when they are introduced into the virtual reality environment, and then interact with the objects within a range of motions and/or head positions that is comfortable to support a more optimal interaction and user experience.

In an illustrative example, if the user is looking at the ground of the virtual world with his chin tilted downwards when a menu object is introduced, just a portion of the menu object is rendered to be visible on the HMD display towards the top of the user's field of view. Showing just a portion of the new menu object enables the user to discover the object while in the chin down head position. The location of the object portion along the top edge of the display indicates to the user that he can view the full menu object by raising his chin up to look forward. Once the user head is oriented to provide a field of view that supports the original object location, the HMD device renders the new menu object within the user's field of view and can typically enable full interaction. In this illustrative example, user interaction with the menu object is more optimal and comfortable when the head is oriented in a neutral pose as compared to the chin down orientation when the new menu object was introduced to the virtual world.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

FIGS. 4-10 show illustrative interactive virtual objects being displayed within the field of view of a user of an HMD device;

Like reference numerals indicate like elements in the drawings. Elements are not drawn to scale unless otherwise indicated.

DETAILED DESCRIPTION

Figure 1:
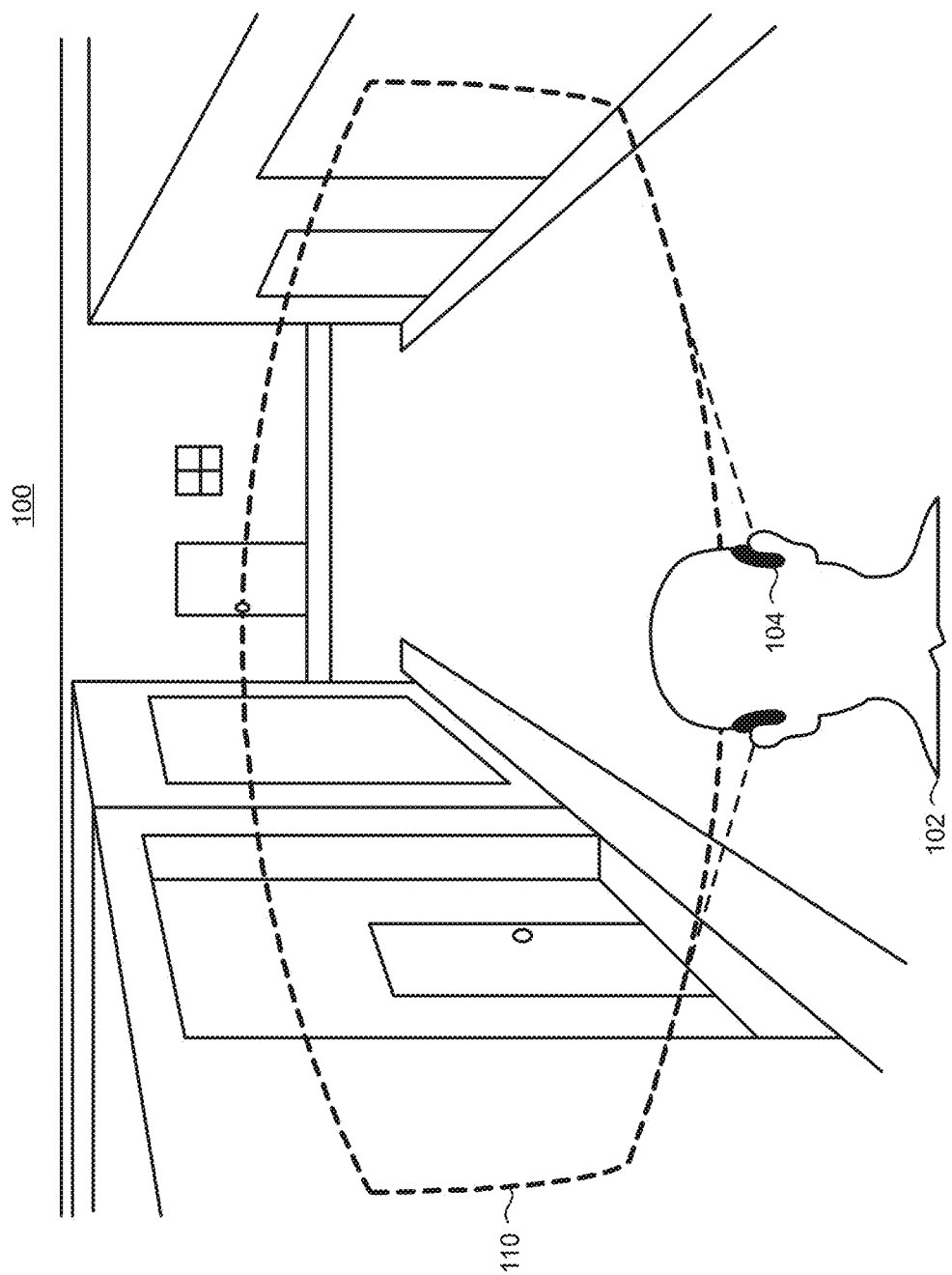
FIG. 1 shows an illustrative virtual reality environment, a portion of which is rendered within the field of view of a user of an HMD device.
Figure 2:
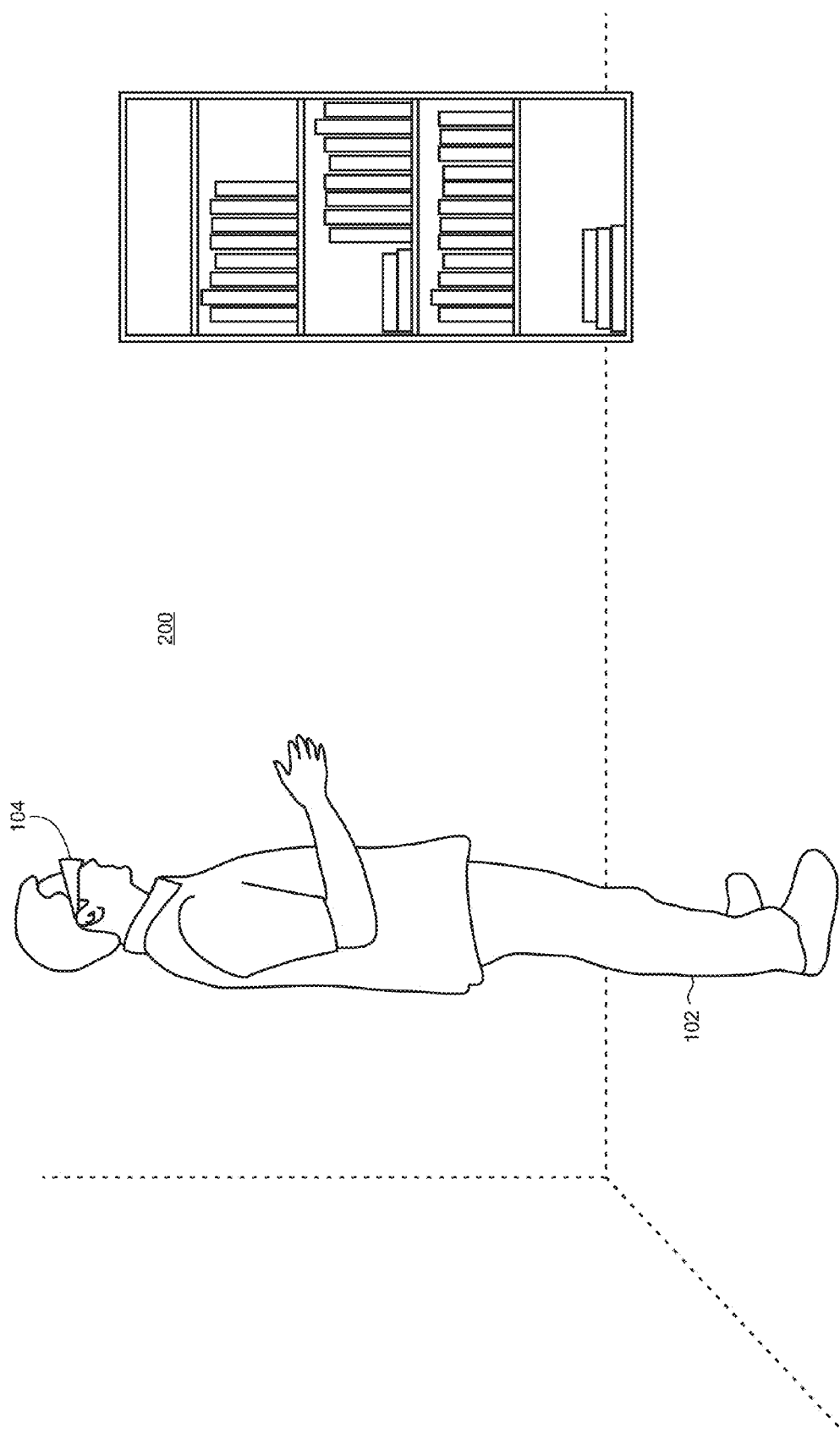
FIG. 2 show an illustrative real world environment in which a user of an HMD device is located.

Users can typically explore, navigate, interact, and move within a virtual reality environment rendered by an HMD device when located within an associated real world space. An illustrative virtual reality environment 100 is shown in FIG. 1 and an illustrative real world space 200 is shown in FIG. 2. The user 102 employs an HMD device 104 to experience the virtual reality environment 100 that is rendered visually on an optics display and may include audio and/or tactile/haptic sensations in some implementations. In this particular non-limiting example, the virtual reality environment 100 includes city streets with various buildings, stores, etc. that the user 102 can see and interact with. As the user changes the position or orientation of his head and/or moves within real world space, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual world.

Figure 3:
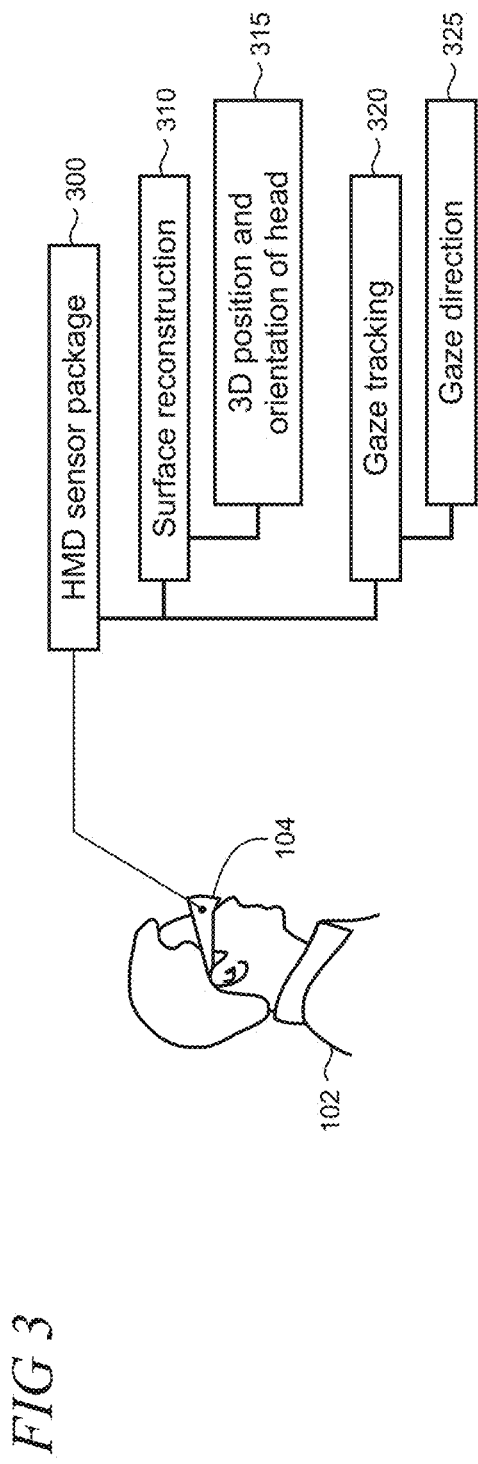
FIG. 3 shows illustrative data provided by an HMD sensor package.

As shown in FIG. 3, the HMD device 104 is configured with a sensor package 300. Exemplary sensors are described in more detail below. The sensor package 300 can support various functionalities including surface reconstruction 310 that may be used for head tracking to determine the 3D (three-dimensional) position and orientation 315 of the user's head within the physical real world space. In some implementations, the sensor package can support gaze tracking 320 to ascertain a direction of the user's gaze 325 which may be used along with the head position and orientation data when implementing the present smart placement of virtual object techniques.

During the course of a given user experience with the HMD device 104, various new virtual objects can be introduced into the environment. Any of a variety of objects may be introduced including those that may be integral to the experience such as an avatar, terrain, and buildings or those that may be used to enhance or control an experience such as interactive elements including menus, widgets, notifications, etc. that may be used to facilitate a given user interface or user experience supported on the HMD device. In the examples that follow, the newly placed virtual objects include interactive elements but it is emphasized that the disclosed smart placement of virtual object techniques may be adapted for use with other virtual objects.

In typical implementations, the field of view 110 for the HMD device 104 can be relatively limited. Accordingly, there is potential for virtual objects that are being introduced into the virtual reality environment that will appear outside the user's field of view at a given time and thus may be difficult to locate or discover. Accordingly, in view of the user's head position and orientation (and gaze direction in some implementations) tracked using the sensor package, the HMD device 104 is configured to perform a check to confirm that the new object's intended location is significantly within the field of view 110 so as to be readily discoverable. If the new virtual object's location is so confirmed, then the object may be placed in its intended original location in the virtual world in some implementations. If the new virtual object cannot be confirmed to be significantly within the field of view 110, then HMD device 104 relocates the object so that it is just viewable on the edge of the display nearest to the original location.

Figure 4:
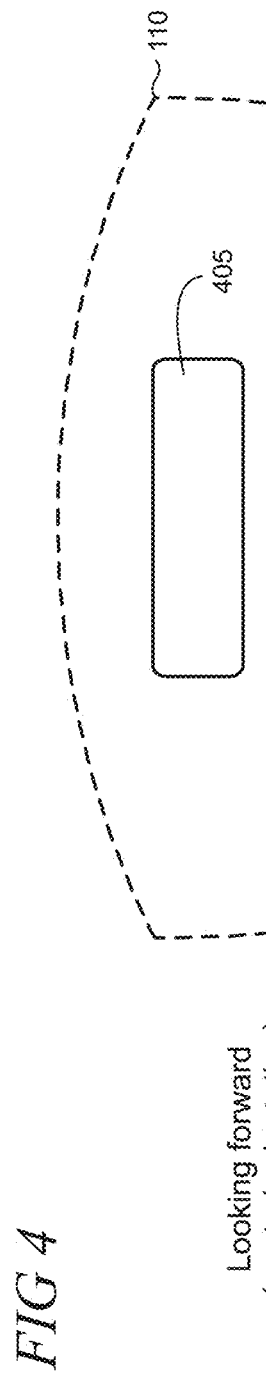

FIGS. 4 to 10 show illustrative examples of smart virtual object placement. FIG. 4 shows an exemplary virtual object 405 that is introduced into a virtual world within the user's field of view 110 (the view of the virtual world is omitted for the sake of clarity of exposition) at some point in the user experience. The virtual object 405 is intended be illustrative and rendered virtual objects can vary from what is shown in size, shape, and location in the field of view. In this particular example, the virtual object 405 is a free-floating interactive element that is rendered in full when the user's head is in a neutral orientation where the user is looking forward in some arbitrary direction. From the neutral orientation, the user can rotate his head to look left and right, tilt his head forward and backwards (i.e., chin down and chin up) to look down and up, and employ various combinations of tilt and rotation. The user can also change his direction of gaze in combination with head motion in some implementations to alter the field of view. It is emphasized that the particular head poses that may be adopted by the user with which full object rendering is supported can vary by implementation. Generally, the user has a larger potential range of head motion when it is neutrally oriented as compared with other orientations and the neutral orientation is often the most comfortable to maintain. Thus, adopting a neutral head orientation can often be desirable when interacting with a new interactive virtual element, particularly when such interaction may take time such as selecting options from a menu, using a widget, etc.

Figure 5:
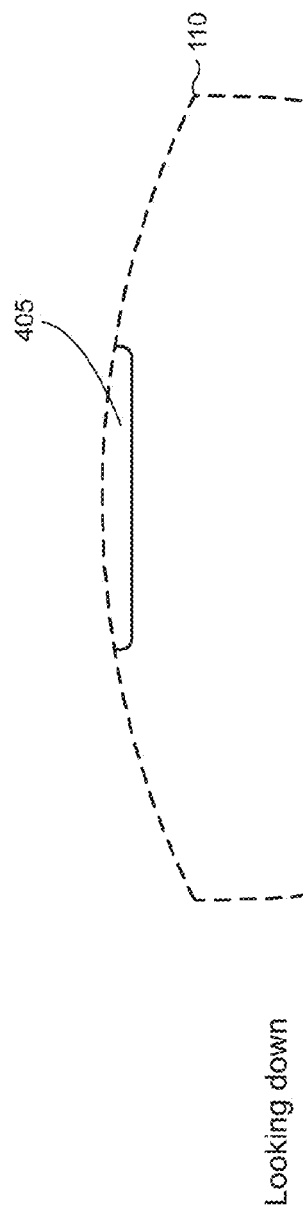

If the new virtual object 405 is introduced when the user is looking down, it would normally be outside the field of view 110 since its intended placement is in a part of the virtual world that can be seen when looking forward, as described above. In this case, as shown in FIG. 5, the HMD device 104 operates to relocate the virtual object so that just a portion of it is in the field of view 110 closest to the edge to its intended original location. In this example, the bottom of the virtual object 405 is viewable along the top edge of the field of view 110 when the user is looking down. As the virtual object is not fully viewable, interactivity is typically disabled in this situation.

Figure 6:
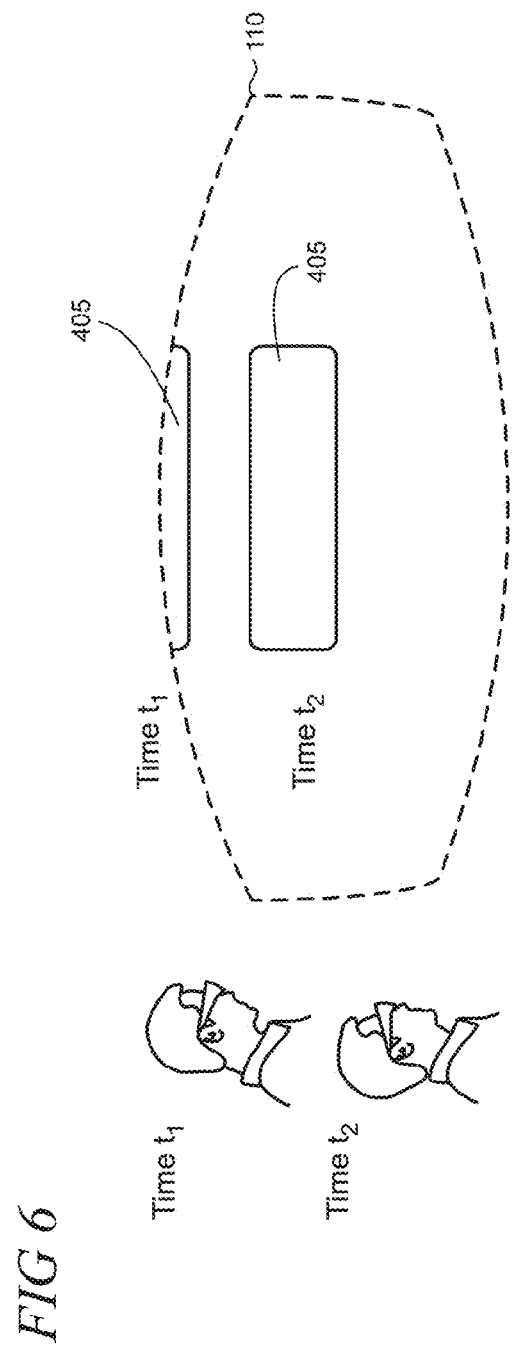
Figure 7:
Figure 8:
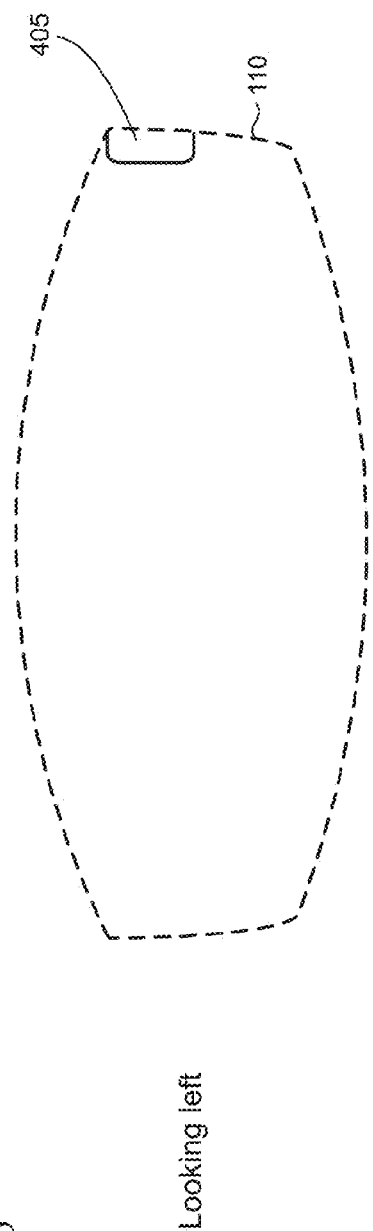

As shown in FIG. 6, the user is looking down at time $t_1$ when the new virtual object 405 is introduced. At time $t_2$, when the user looks up and returns his head to the neutral position, the HMD device 104 renders the new virtual object fully in its original intended position in the virtual world and enables interactivity. FIGS. 7, 8, and 9 show how the HMD device 104 relocates the virtual object 405 to be just viewable within the field of view when the user is respectively looking up, left, and right and otherwise would not see the object if located in its intended original location in the virtual reality environment. In each case, the relocated virtual object 405 is positioned at the edge of the display that is closest to its original location.

In some implementations, the relocated virtual object in partial view may be dynamically positioned and/or repositioned at various points around the perimeter of the field of view depending on a particular head pose (i.e., combinations of rotation and tilt). The HMD device's positioning of the partial view of the new virtual object in the field of view can be used as a method of directing or steering the user's head location and/or position in the space to enable the new virtual object to be seen in full view. The user can be expected to intuitively move his head in the direction of the partial view in order to see the full view of the new virtual object.

FIG. 10 shows that a variety of optional treatments may be applied to the relocated virtual object 405 in some cases. Highlights including colors, graphics, animations, text, and the like (representatively indicated by reference numeral 1010) can be applied to the virtual object to gather the user's attention and/or provide information or guidance in some scenarios. Separate graphic or text indicators 1015 can also be utilized. In addition, when the user moves his head into a position/orientation that allows the full view of the new virtual object 405 to be rendered, the object can be animated to move from its partial view along the edge of the field of view 110 into its full view. Animations may also be employed in some scenarios, as illustratively indicated by reference numeral 1020 in FIG. 10.

Figure 11:
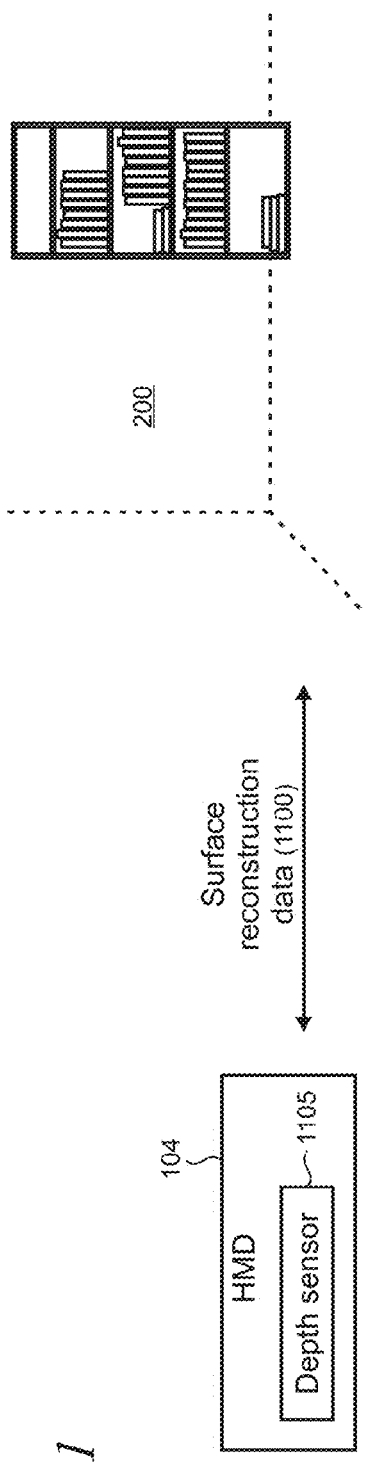
FIG. 11 depicts surface reconstruction data associated with real world objects being captured by an HMD device.
Figure 12:
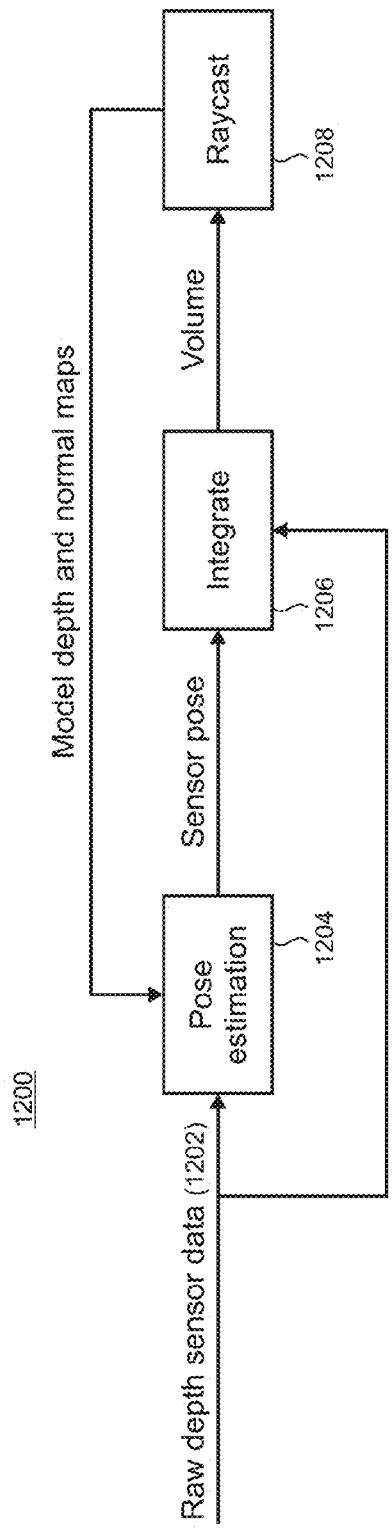
FIG. 12 shows a block diagram of an illustrative surface reconstruction pipeline.

As noted above, the device 104 is configured to obtain surface reconstruction data 1100 by using a sensor package that includes an integrated depth sensor 1105, as shown in FIG. 11, in order to perform head tracking. In alternative implementations, depth data can be derived using suitable stereoscopic image analysis techniques. FIG. 12 shows an illustrative surface reconstruction data pipeline 1200 for obtaining surface reconstruction data for objects in the real world space. It is emphasized that the disclosed technique is illustrative and that other techniques and methodologies may be utilized depending on the requirements of a particular implementation. Raw depth sensor data 1202 is input into a 3D (three-dimensional) pose estimate of the sensor (block 1204). Sensor pose tracking can be achieved, for example, using ICP (iterative closest point) alignment between the predicted surface and current sensor measurement. Each depth measurement of the sensor can be integrated (block 1206) into a volumetric representation using, for example, surfaces encoded as a signed distance field (SDF). Using a loop, the SDF is raycast (block 1208) into the estimated frame to provide a dense surface prediction to which the depth map is aligned. Thus, when the user 102 looks around the virtual world, surface reconstruction data associated with the real world space 200 (FIG. 2) can be collected and analyzed to determine the user's head position and orientation within the space.

Figure 13:
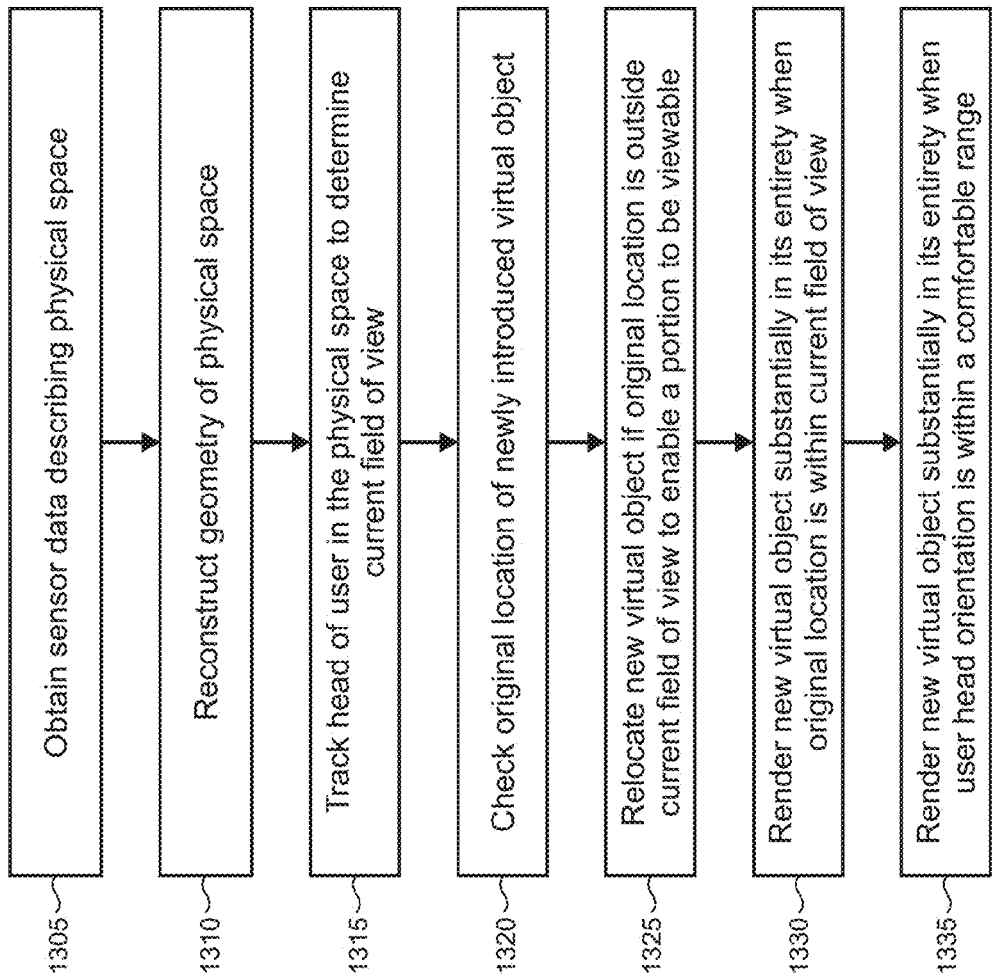
FIGS. 13, 14, and 15 are flowcharts of illustrative methods that may be performed using an HMD device.
Figure 14:
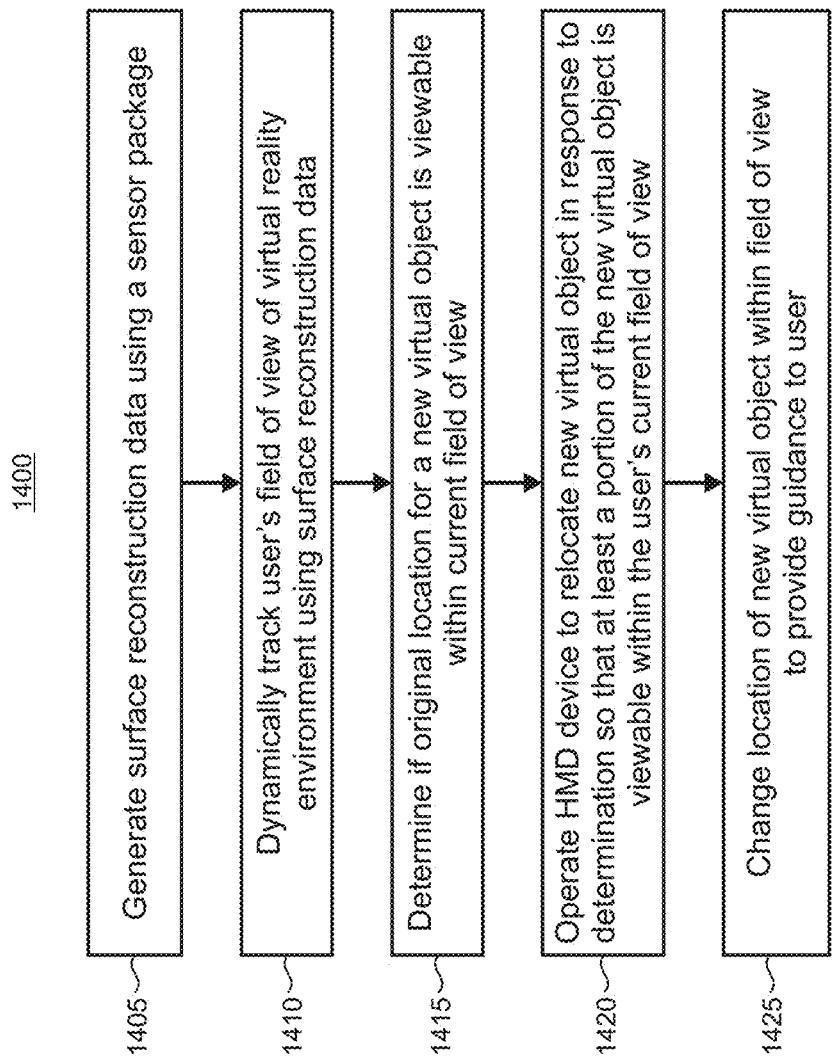
Figure 15:
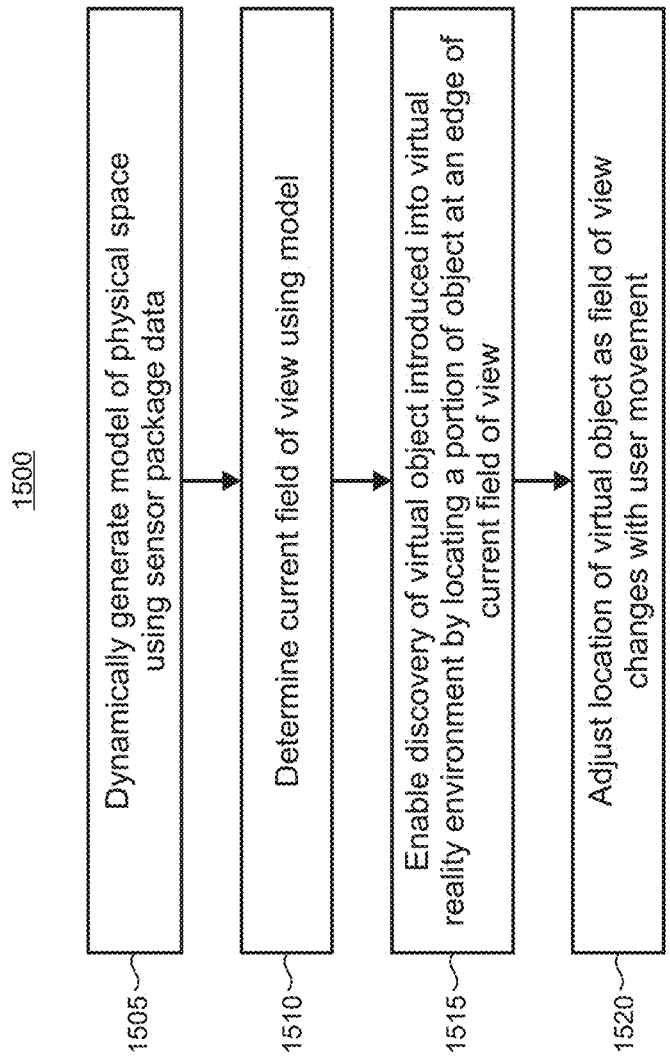

FIGS. 13, 14, and 15 are flowcharts of illustrative methods that may be performed using the HMD device 104. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 1300 in FIG. 13 may be performed by an HMD device that supports rendering of a virtual reality environment. In step 1305, sensor data is obtained which describes a physical space that adjoins a user of an HMD device. The sensor data can include, for example, depth data using a depth sensor that is integrated into the HMD device or be obtained from an external sensor or source. Depth-from-stereo imaging analyses may also be used to create depth data. In step 1310, the sensor data is used to reconstruct a geometry of the physical space, for example, using surface reconstruction.

In step 1315, the reconstructed geometry of the physical space is used to perform tracking of the user's head to determine a current field of view of the virtual reality environment. Gaze detection may also be utilized in some scenarios when determining the current field of view.

When a virtual object is newly introduced into the virtual reality environment, in step 1320, its original location is checked. The virtual object could be placed at some arbitrary location within the virtual environment. In some cases, the new object and its original location may have a contextual association with some other object or aspect of the virtual reality environment. For example, the new object could be a notification that is associated with a particular building in the cityscape shown in the virtual environment 100 in FIG. 1. In such cases, it may be desirable for the notification object to be placed within the field of the view of the user when he is looking at the building. Accordingly, the original location for the notification object may be near the front entrance to the building, for example. In other cases, the new virtual object may not have an association with a particular location in the virtual reality environment. However, rather than introduce the new virtual object fully into the user's current field of view, it may be more optimal to render the object fully only when the user's head is positioned and/or oriented within some threshold range. Some virtual objects that feature user interactivity may support better user experiences when the user engages with them with a particular head orientation. For example, if a menu object supporting interactivity through sensed head motions is rendered when the user has a chin down head orientation, it may be uncomfortable for the user to interact with the menu object since his range of head motions is restricted as compared with a neutral orientation.

In step 1325, the HMD device relocates the new virtual object if the original location is outside the current field of view so that at least a portion of the object is viewable within the current field of view. In step 1330, the new virtual object is rendered substantially in its entirety when the original location for the object is within the current field of view. Alternatively, in step 1335, the new virtual object is rendered substantially in its entirety when the user's head is brought within some predetermined range of head orientations that are generally comfortable for the user. In some cases, a virtual object may be launched and then anchored to a location in the virtual world that is different from its original location. For example, when a user is looking down, a new menu object may be launched and clipped to the top of the user's field of view. In such a case, the menu object may be anchored at that location in the virtual world which could be lower than its intended original location.

Method 1400 in FIG. 14 may be performed by an HMD device having one or more processors, a display for rendering a virtual reality environment using a variable field of view, and one or more memory devices that store computer-readable instructions such as software code that can be utilized to implement the method. In step 1405, surface reconstruction data is generated using a sensor package that is incorporated into the HMD device which may include a depth sensor or camera system. In step 1410, the surface reconstruction data is used to dynamically track the user's current field of view of the virtual reality environment. Various suitable surface reconstruction techniques may be utilized including that shown in the pipeline in FIG. 12 in which multiple overlapping surfaces are integrated. In step 1415, it is determined if an original location for a new virtual object introduced into the virtual reality environment enables the new virtual object to be seen within the user's current field of view. Responsively to the determination, the HMD device is operated in step 1420 to relocate the new virtual object from the original location in response to the determination so that at least a portion of the new virtual object is viewable within the user's current field of view. In step 1425, the HMD device changes the location of the new virtual object within the user's field of view to provide guidance to the user. For example, the positioning of the virtual object portion can move along the outside edge of the field of view to help steer the user's head into a suitable position and orientation that enables a full view of the virtual object.

Method 1500 in FIG. 15 may be performed by instructions stored on an HMD device operating in a physical space and having a display that renders a virtual reality environment. In step 1505, a surface reconstruction model of the physical space is dynamically generated using data from a sensor package onboard the HMD device. The model can be updated, for example, on a frame-by-frame or other suitable basis, as the user moves within the physical space. The current surface reconstructed model is utilized to determine the user's current field of view of the virtual reality environment in step 1510. In step 1515, discovery of virtual objects introduced into the virtual reality environment is enabled by locating a portion of the object at an edge of the current field of view. The location can vary according to changes in the field of view that occur as a result of user movement in step 1520.

Figure 16:
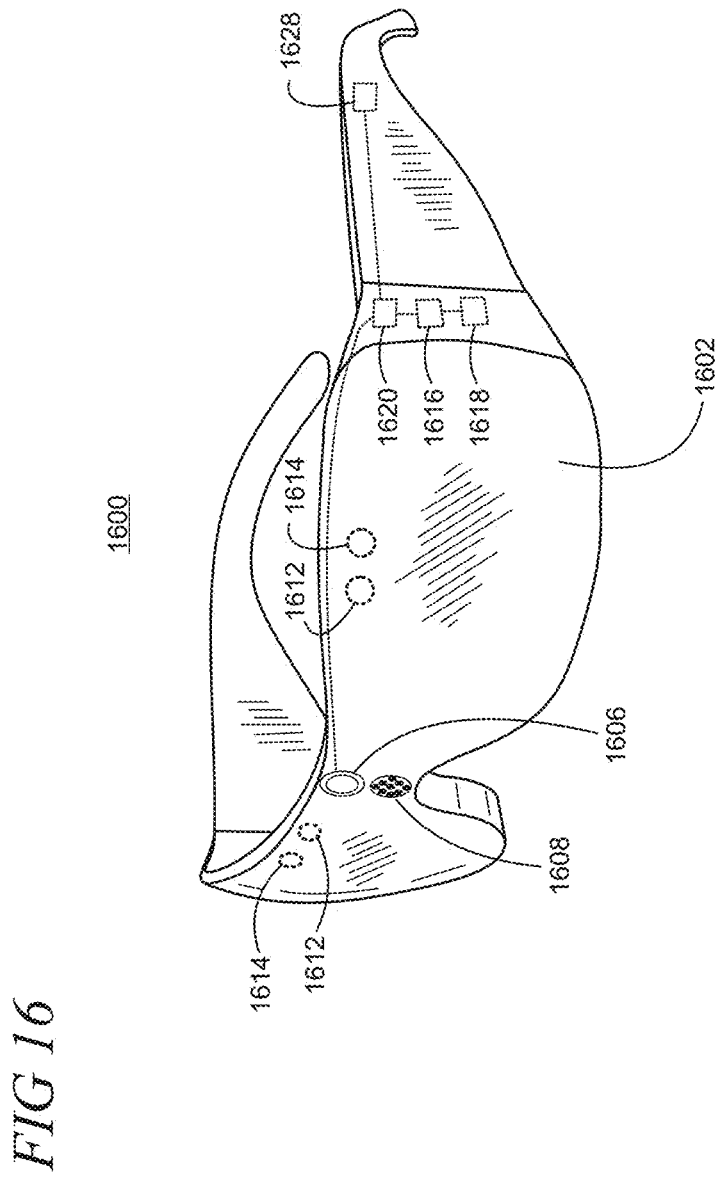
FIG. 16 is a pictorial view of an illustrative example of a virtual reality HMD device.
Figure 17:
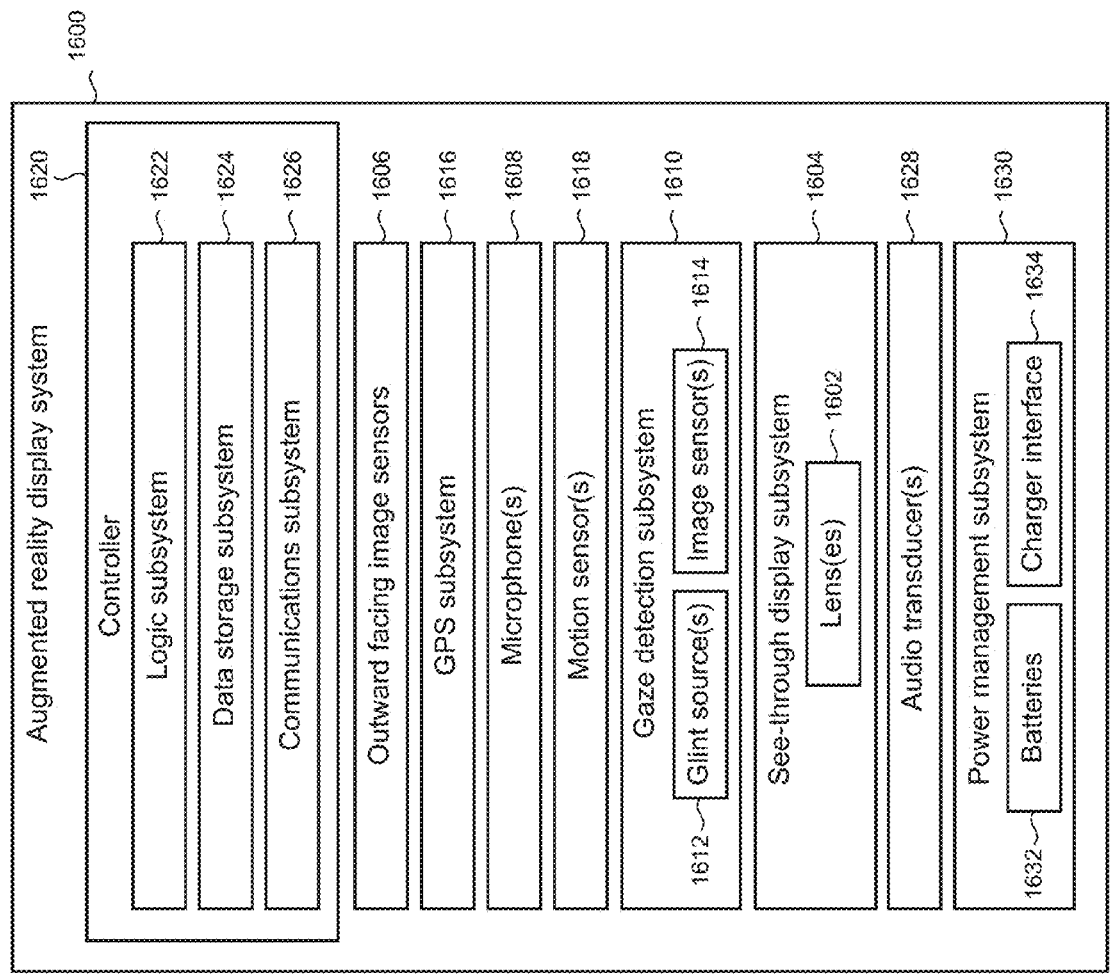
FIG. 17 shows a functional block diagram of an illustrative example of a virtual reality HMD device.
Figure 18:
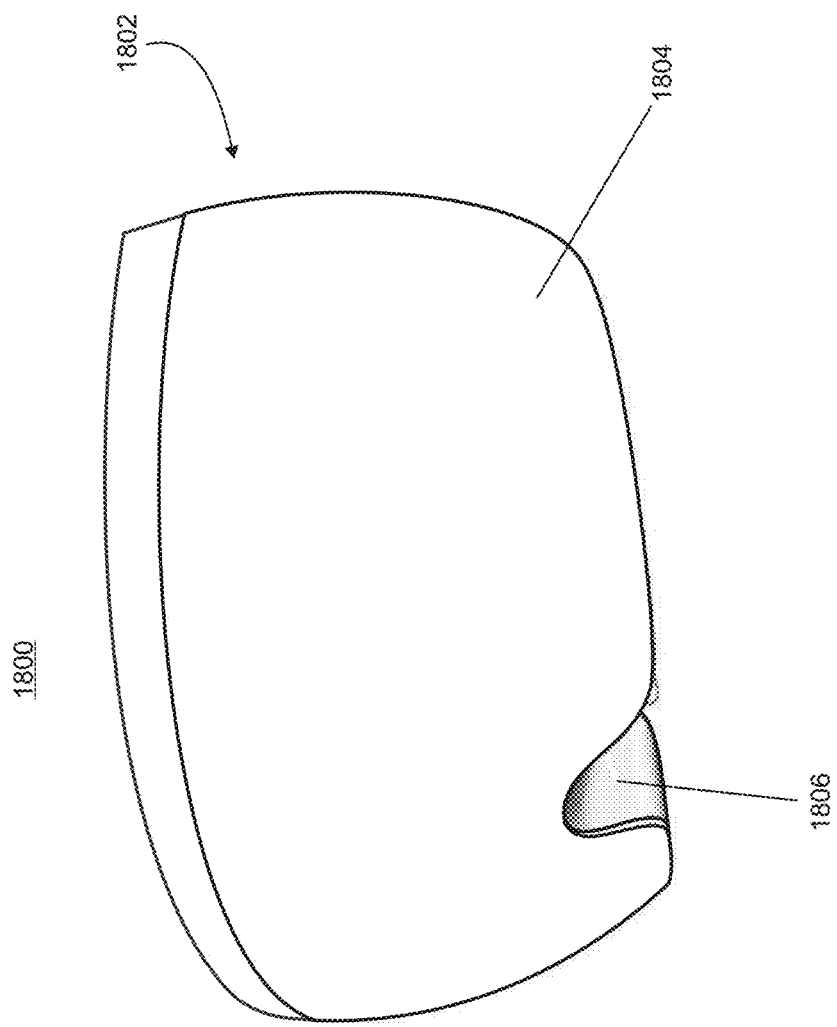
FIGS. 18 and 19 are pictorial front views of an illustrative sealed visor that may be used as a component of a virtual reality HMD device.
Figure 19:
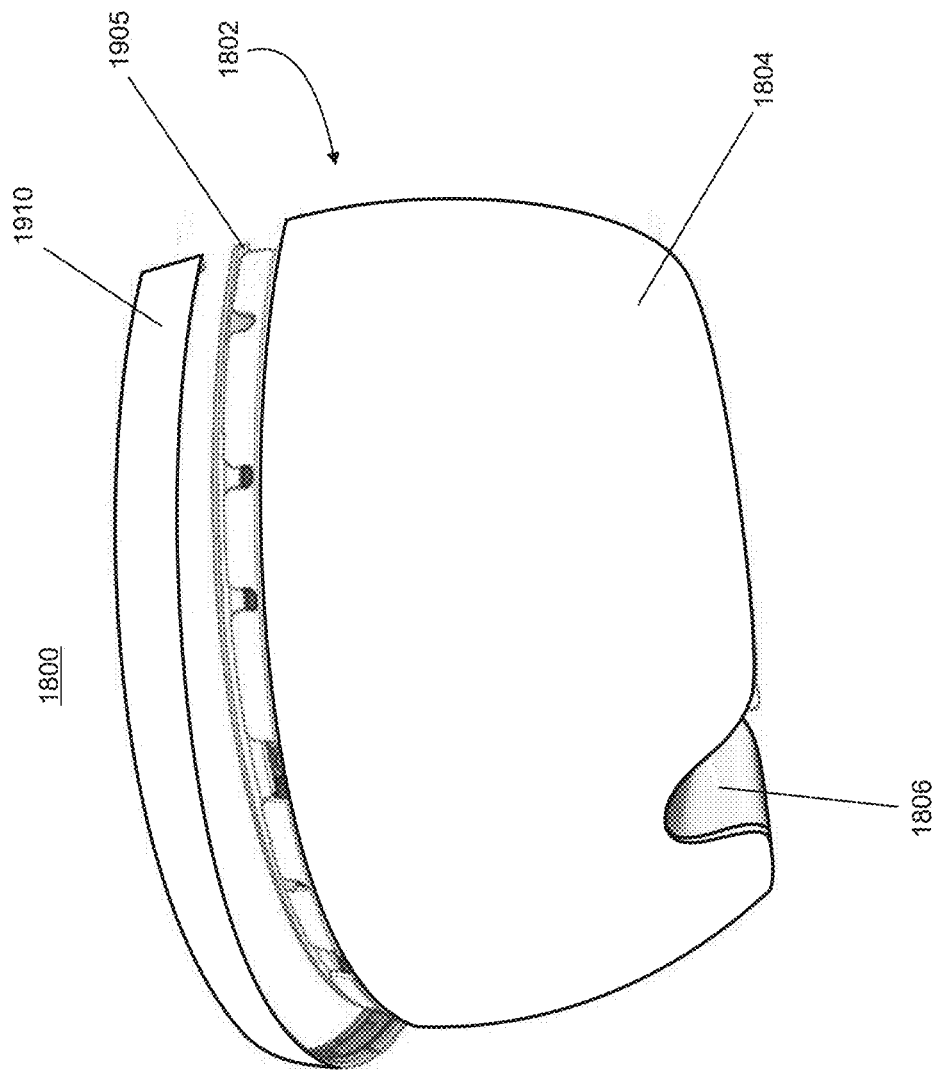

Turning now to various illustrative implementation details, a see-through, mixed reality display device according to the present arrangement may take any suitable form, including but not limited to near-eye devices such as the HMD device 104 and/or other portable/mobile devices. FIG. 16 shows one particular illustrative example of a see-through, mixed reality display system 1600, and FIG. 17 shows a functional block diagram of the system 1600. Display system 1600 comprises one or more lenses 1602 that form a part of a see-through display subsystem 1604, such that images may be displayed using lenses 1602 (e.g. using projection onto lenses 1602, one or more waveguide systems incorporated into the lenses 1602, and/or in any other suitable manner). Display system 1600 further comprises one or more outward-facing image sensors 1606 configured to acquire images of a background scene and/or physical space being viewed by a user, and may include one or more microphones 1608 configured to detect sounds, such as voice commands from a user. Outward-facing image sensors 1606 may include one or more depth sensors and/or one or more two-dimensional image sensors. In alternative arrangements, a mixed reality display system, instead of incorporating a see-through display subsystem, may display mixed reality images through a viewfinder mode for an outward-facing image sensor.

The display system 1600 may further include a gaze detection subsystem 1610 configured for detecting a direction of gaze of each eye of a user or a direction or location of focus, as described above. Gaze detection subsystem 1610 may be configured to determine gaze directions of each of a user's eyes in any suitable manner. For example, in the illustrative example shown, a gaze detection subsystem 1610 includes one or more glint sources 1612, such as infrared light sources, that are configured to cause a glint of light to reflect from each eyeball of a user, and one or more image sensors 1614, such as inward-facing sensors, that are configured to capture an image of each eyeball of the user. Changes in the glints from the user's eyeballs and/or a location of a user's pupil, as determined from image data gathered using the image sensor(s) 1614, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1610 may have any suitable number and arrangement of light sources and image sensors. In some implementations, the gaze detection subsystem 1610 may be omitted.

The display system 1600 may also include additional sensors. For example, display system 1600 may comprise a global positioning system (GPS) subsystem 1616 to allow a location of the display system 1600 to be determined. This may help to identify real world objects, such as buildings, etc. that may be located in the user's adjoining physical environment.

The display system 1600 may further include one or more motion sensors 1618 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 1606. The use of motion data may allow changes in gaze location to be tracked even if image data from outward-facing image sensor(s) 1606 cannot be resolved.

In addition, motion sensors 1618, as well as microphone(s) 1608 and gaze detection subsystem 1610, also may be employed as user input devices, such that a user may interact with the display system 1600 via gestures of the eye, neck and/or head, as well as via verbal commands in some cases. It may be understood that sensors illustrated in FIGS. 16 and 17 and described in the accompanying text are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1600 can further include a controller 1620 having a logic subsystem 1622 and a data storage subsystem 1624 in communication with the sensors, gaze detection subsystem 1610, display subsystem 1604, and/or other components through a communications subsystem 1626. The communications subsystem 1626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1624 may include instructions stored thereon that are executable by logic subsystem 1622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1600 is configured with one or more audio transducers 1628 (e.g., speakers, earphones, etc.) so that audio can be utilized as part of an augmented reality experience. A power management subsystem 1630 may include one or more batteries 1632 and/or protection circuit modules (PCMs) and an associated charger interface 1634 and/or remote power interface for supplying power to components in the display system 1600.

It may be appreciated that the depicted display devices 104 and 1600 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 18-22 show an illustrative alternative implementation for an augmented reality display system 1800 that may be used as a component of an HMD device. In this example, the system 1800 uses a see-through sealed visor 1802 that is configured to protect the internal optics assembly utilized for the see-through display subsystem. The visor 1802 is typically interfaced with other components of the HMD device (not shown) such as head mounting/retention systems and other subsystems including sensors, power management, controllers, etc., as illustratively described in conjunction with FIGS. 16 and 17. Suitable interface elements (not shown) including snaps, bosses, screws and other fasteners, etc. may also be incorporated into the visor 1802.

The visor includes see-through front and rear shields 1804 and 1806 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1905 as depicted in the partially exploded view in FIG. 19 in which a shield cover 1910 is shown as disassembled from the visor 1802.

The sealed visor 1802 can physically protect sensitive internal components, including an optics display subassembly 2002 (shown in the disassembled view in FIG. 20) when the HMD device is worn and used in operation and during normal handling for cleaning and the like. The visor 1802 can also protect the optics display subassembly 2002 from environmental elements and damage should the HMD device be dropped or bumped, impacted, etc. The optics display subassembly 2002 is mounted within the sealed visor in such a way that the shields do not contact the subassembly when deflected upon drop or impact.

Figure 20:
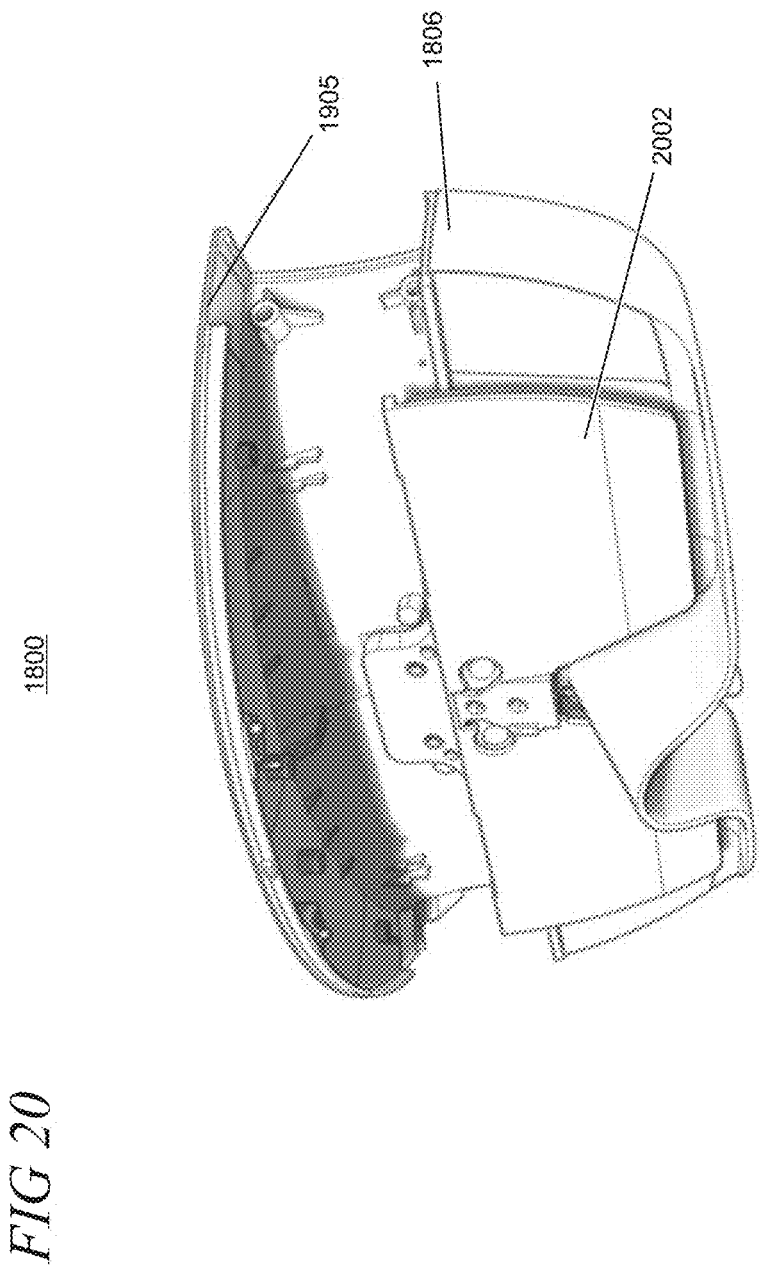
FIG. 20 shows a view of the sealed visor when partially disassembled.
Figure 21:
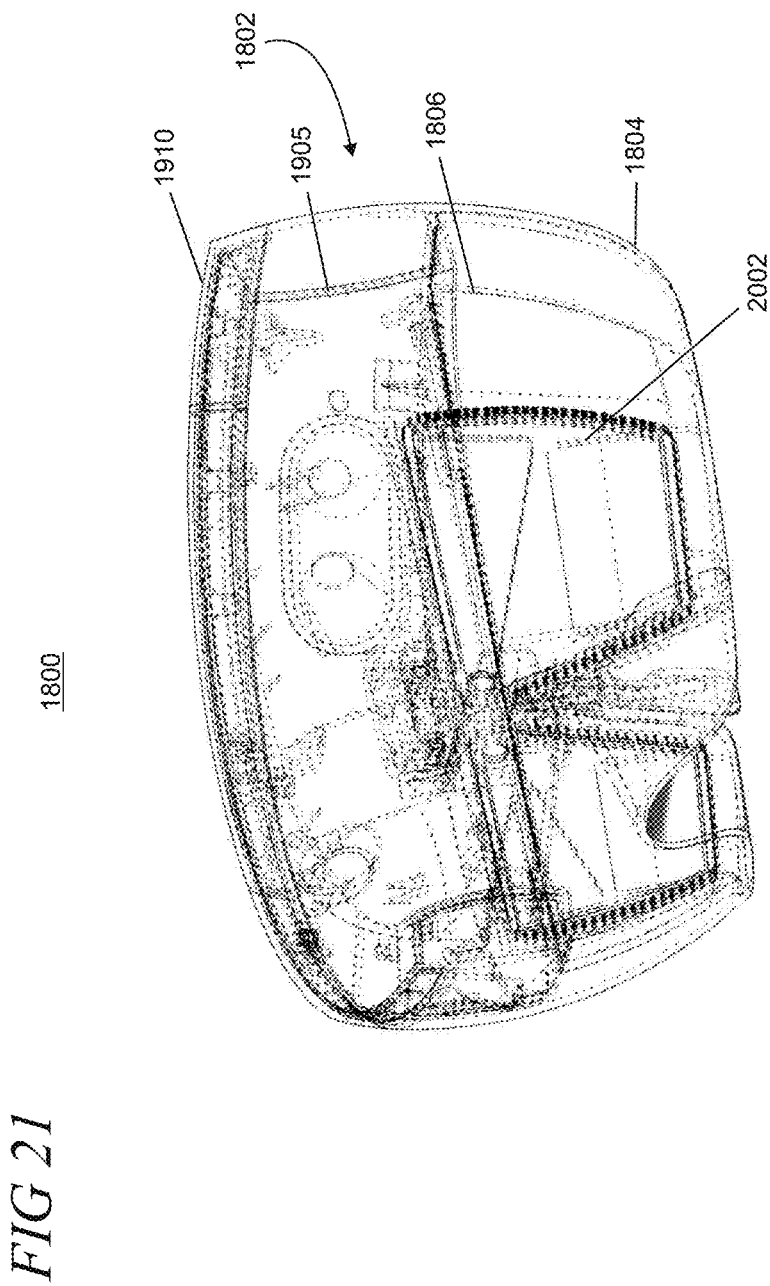
FIG. 21 shows a phantom line front view of the sealed visor.
Figure 22:
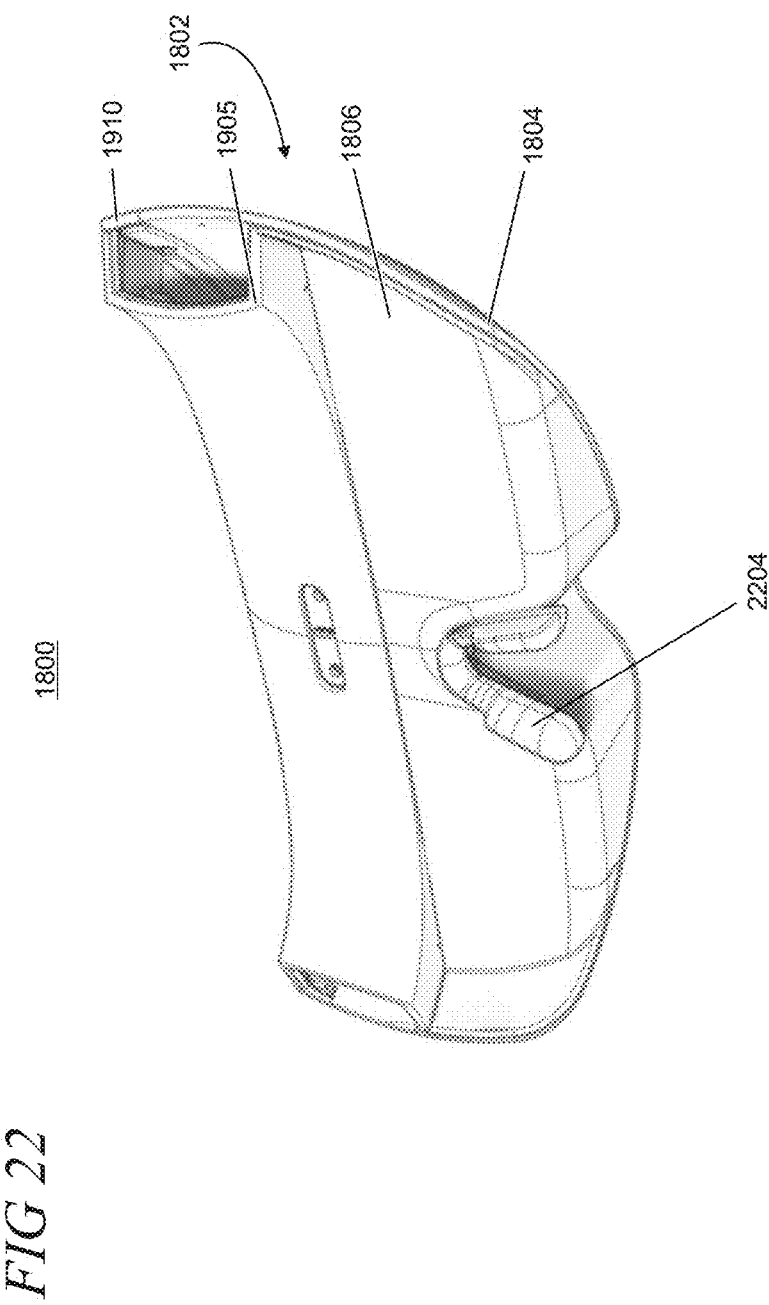
FIG. 22 shows a pictorial back view of the sealed visor.

As shown in FIGS. 20 and 22, the rear shield 1806 is configured in an ergonomically correct form to interface with the user's nose and nose pads 2204 (FIG. 22) and other comfort features can be included (e.g., molded-in and/or added-on as discrete components). The sealed visor 1802 can also incorporate some level of optical diopter curvature (i.e., eye prescription) within the molded shields in some cases.

Figure 23:
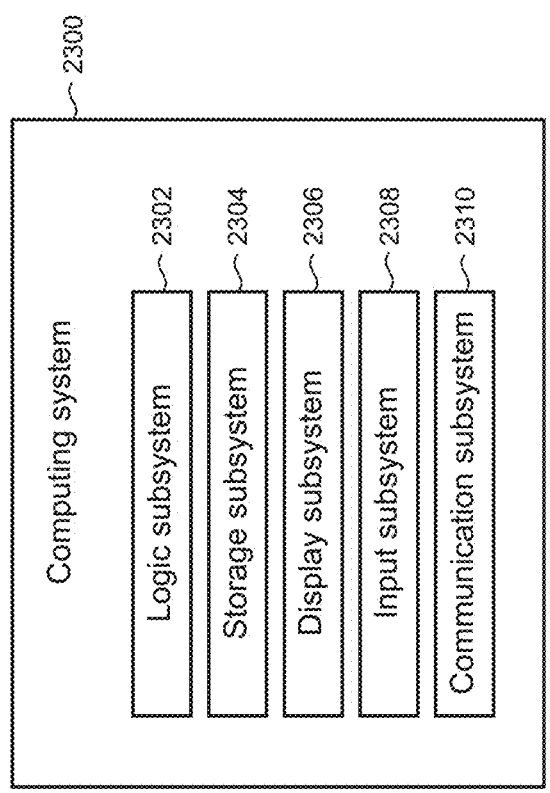
FIG. 23 shows an exemplary computing system.

FIG. 23 schematically shows a non-limiting embodiment of a computing system 2300 that can be used when implementing one or more of the configurations, arrangements, methods, or processes described above. The HMD device 104 may be one non-limiting example of computing system 2300. The computing system 2300 is shown in simplified form. It may be understood that virtually any computer architecture may be used without departing from the scope of the present arrangement. In different embodiments, computing system 2300 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 2300 includes a logic subsystem 2302 and a storage subsystem 2304. The computing system 2300 may optionally include a display subsystem 2306, an input subsystem 2308, a communication subsystem 2310, and/or other components not shown in FIG. 23.

The logic subsystem 2302 includes one or more physical devices configured to execute instructions. For example, the logic subsystem 2302 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 2302 may include one or more processors configured to execute software instructions. Additionally or alternatively, the logic subsystem 2302 may include one or more hardware or firmware logic machines configured to execute hardware or firmware instructions. The processors of the logic subsystem 2302 may be single-core or multi-core, and the programs executed thereon may be configured for sequential, parallel, or distributed processing. The logic subsystem 2302 may optionally include individual components that are distributed among two or more devices, which can be remotely located and/or configured for coordinated processing. Aspects of the logic subsystem 2302 may be virtualized and executed by remotely accessible, networked computing devices configured in a cloud-computing configuration.

The storage subsystem 2304 includes one or more physical devices configured to hold data and/or instructions executable by the logic subsystem 2302 to implement the methods and processes described herein. When such methods and processes are implemented, the state of the storage subsystem 2304 may be transformed—for example, to hold different data.

The storage subsystem 2304 may include removable media and/or built-in devices. The storage subsystem 2304 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 2304 may include volatile, nonvolatile, dynamic, static, read/write, read-only, random-access, sequential-access, location-addressable, file-addressable, and/or content-addressable devices.

It may be appreciated that the storage subsystem 2304 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 2302 and of the storage subsystem 2304 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 2306 may be used to present a visual representation of data held by storage subsystem 2304. This visual representation may take the form of a graphical user interface (GUI). As the present described methods and processes change the data held by the storage subsystem, and thus transform the state of the storage subsystem, the state of the display subsystem 2306 may likewise be transformed to visually represent changes in the underlying data. The display subsystem 2306 may include one or more display devices utilizing virtually any type of technology. Such display devices may be combined with logic subsystem 2302 and/or storage subsystem 2304 in a shared enclosure in some cases, or such display devices may be peripheral display devices in others.

When included, the input subsystem 2308 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 2310 may be configured to communicatively couple the computing system 2300 with one or more other computing devices. The communication subsystem 2310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2300 to send and/or receive messages to and/or from other devices using a network such as the Internet.

Various exemplary embodiments of the present smart placement of virtual objects to stay in the field of view of a head mounted display are now presented by way of illustration and not as an exhaustive list of all embodiments. An example includes a method performed by a head mounted display (HMD) device that supports rendering of a virtual reality environment within a field of view, comprising: obtaining sensor data describing a physical space adjoining a user of the HMD device; using the sensor data, reconstructing a geometry of the physical space; tracking the user's head in the physical space using the reconstructed geometry to determine a current field of view; when a new virtual object is introduced into the virtual reality environment, checking its original location; and relocating the new virtual object if the original location is outside the current field of view so that at least a portion of the new virtual object is within the current field of view when relocated.

In another example, the sensor data includes depth data and the method further includes generating the sensor data using a depth sensor and applying surface reconstruction techniques to reconstruct the physical space geometry. In another example, the method further includes generating depth data using depth-from-stereo imaging analyses. In another example, the method further includes relocating the new virtual object along an edge of the field of view in a position that is closest to the original location in the virtual reality environment. In another example, the method further includes rendering the new virtual object substantially in its entirety when the original location is within the field of view. In another example, the method further includes rendering the new virtual object substantially in its entirety when an orientation of the head is within a range of comfortable orientations for the user. In another example, the range of comfortable orientations includes a neutral head orientation. In another example, the method further includes detecting a gaze direction of the user when determining the current field of view. In another example, the new virtual object is an interactive element supporting a user interface or a user experience. In another example, the interactive element is one of menu, widget, or notification.

A further example includes a head mounted display (HMD) device operable by a user in a physical environment, comprising: one or more processors; a display for rendering a virtual reality environment to the user, a field of view of the rendered virtual reality environment being variable depending at least in part on a pose of the user's head in the physical environment; a sensor package; and one or more memory devices storing computer-readable instructions which, when executed by the one or more processors, perform a method comprising the steps of: generating surface reconstruction data for at least a portion of the physical environment using the sensor package, dynamically tracking the user's field of view of the virtual reality environment using the surface reconstruction data, determining if an original location for a new virtual object introduced into the virtual reality environment enables the new virtual object to be viewable within the user's current field of view, and operating the HMD device to relocate the new virtual object from the original location in response to the determination so that at least a portion of the new virtual object is viewable within the user's current field of view.

In another example, the HMD device further includes changing a location of the new virtual object within the current field of view in response to movement from the user, the movement including head movement or eye movement. In another example, the location is changed so as to guide the user to the original location of the new virtual object and further including rendering the new virtual object in full view when the current field of view includes the original location. In another example, the location is changed so as to guide the user to assume a head pose that falls within a predetermined range and further including rendering the new virtual object in full view when the head pose is assumed. In another example, the HMD device further includes modeling the physical environment using a surface reconstruction data pipeline that implements a volumetric method creating multiple overlapping surfaces that are integrated. In another example, the HMD device further includes a sealed protective visor that substantially encases the display.

A further example includes one or more computer readable memories storing computer-executable instructions for rendering a virtual reality environment within a variable field of view of a head mounted display (HMD) device located in a real world space, the method comprising the steps of: using data from a sensor package incorporated into the HMD device to dynamically generate a surface reconstruction model of the real world space; determining a current field of view of the virtual reality environment using the model; enabling discovery by the user of a virtual object introduced into the virtual reality environment by locating at least a portion of the virtual object at an edge of the current field of view; and adjusting the location of the virtual object as the current field of view changes with movement by the user.

In another example, the adjusting comprises moving the location of the virtual object along the edge of the current field of view. In another example, the one or more computer-readable memories further include locating the virtual object to be viewable substantially in full within the current field of view when a pose of the user's head is within a threshold range. In another example, the one or more computer-readable memories further include locating the virtual object to be viewable substantially in full within the current field of view when an intended original location for the virtual object is within the current field of view.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head mounted display (HMD) device that supports rendering of a virtual reality environment within a field of view, comprising:
   obtaining sensor data describing a physical space adjoining a user of the HMD device;
   using the sensor data, reconstructing a geometry of the physical space;
   tracking the user's head in the physical space using the reconstructed geometry to determine a current field of view of the user;
   when a new virtual object is being introduced into the virtual reality environment, checking its original intended location; and
   relocating the new virtual object when and while the original intended location is outside the user's current field of view so that at least a portion of the new virtual object is within the user's current field of view when relocated.

2. The method of claim 1 in which the sensor data includes depth data and further including generating the sensor data using a depth sensor and applying surface reconstruction techniques to reconstruct the physical space geometry.

3. The method of claim 1 further including generating depth data using depth-from-stereo imaging analyses.

4. The method of claim 1 further including relocating the new virtual object along an edge of the user's current field of view in a position that is closest to the original intended location in the virtual reality environment.

5. The method of claim 1 further including rendering the new virtual object substantially in its entirety when the original intended location is within the user's current field of view.

6. The method of claim 1 further including rendering the new virtual object substantially in its entirety when an orientation of the head is within a range of comfortable orientations for the user.

7. The method of claim 6 in which the range of comfortable orientations includes a neutral head orientation.

8. The method of claim 1 further including detecting a gaze direction of the user when determining the current field of view.

9. The method of claim 1 in which the new virtual object is an interactive element supporting a user interface or a user experience.

10. The method of claim 9 in which the interactive element is one of menu, widget, or notification.

11. A head mounted display (HMD) device operable by a user in a physical environment, comprising:
   one or more processors;
   a display for rendering a virtual reality environment to the user, a field of view of the rendered virtual reality environment being variable depending at least in part on a pose of the user's head in the physical environment;
   a sensor package; and
   one or more memory devices storing computer-readable instructions which, when executed by the one or more processors, cause the processors to:
      generate surface reconstruction data for at least a portion of the physical environment using the sensor package,
      dynamically track the user's field of view of the virtual reality environment using the surface reconstruction data,
      determine if an original intended location for a new virtual object being introduced into the virtual reality environment enables the new virtual object to be viewable within the user's current field of view, and
      operate the HMD device to relocate the new virtual object from the original intended location in response to the determination so that at least a portion of the new virtual object is viewable within the user's current field of view, the determination being that the new virtual object is not within the user's current field of view.

12. The HMD device of claim 11, the computer-readable instructions further including instructions that cause the processors to change a location of the new virtual object within the current field of view in response to movement from the user, the movement including head movement or eye movement.

13. The HMD device of claim 12, the computer-readable instructions further including instructions that cause the processors to change the location so as to guide the user to the original intended location of the new virtual object and render the new virtual object in full view when the current field of view includes the original intended location.

14. The HMD device of claim 12, the computer-readable instructions further including instructions that cause the processors to change the location so as to guide the user to assume a head pose that falls within a predetermined range and render the new virtual object in full view when the head pose is assumed.

15. The HMD device of claim 11, the computer-readable instructions further including instructions that cause the processors to model the physical environment using a surface reconstruction data pipeline that implements a volumetric method creating multiple overlapping surfaces that are integrated.

16. The HMD device of claim 11 further including a sealed protective visor that substantially encases the display.

17. One or more computer readable memories storing computer-executable instructions that cause one or more processors of a head mounted display (HMD) device located in a real world space and rendering a virtual reality environment within a variable field of view to:
   use data from a sensor package incorporated into the HMD device to dynamically generate a surface reconstruction model of the real world space;
   determine a user's current field of view of the virtual reality environment using the model;
   determine that an intended original position of a virtual object lies outside the current field of view;
   when and while the virtual object lies outside the current field of view, enable discovery by the user of the virtual object introduced into the virtual reality environment by locating at least a portion of the virtual object at an edge of the current field of view; and
   adjust the location of the virtual object as the current field of view changes with movement by the user.

18. The one or more computer readable memories of claim 17 wherein the instructions to adjust the location of the virtual object further comprise instructions that cause the processors to move the location of the virtual object along the edge of the current field of view.

19. The one or more computer-readable memories of claim 17 further including instructions that cause the processors to locate the virtual object to be viewable substantially in full within the current field of view when a pose of the user's head is within a threshold range.

20. The one or more computer-readable memories of claim 19 further including instructions that cause the processors to enable the user to interact with the virtual object when the pose of the user's head is within the threshold range.

\* \* \* \* \*